Oct. 5, 1948.  V. BALLARD  2,450,572
DECOY
Filed March 5, 1946

INVENTOR
Virgil Ballard
BY
ATTORNEY

Patented Oct. 5, 1948

2,450,572

UNITED STATES PATENT OFFICE 2,450,572

DECOY

Virgil Ballard, Caldwell, Idaho

Application March 5, 1946, Serial No. 652,067

1 Claim. (Cl. 43—3)

The invention relates generally to sporting goods and particularly to a decoy used for hunting birds.

The main object of this invention is to provide an exceedingly simply and efficient form of decoy, which, while life-like, is collapsible, and at the same time may be securely set up in a natural position, without requiring unusual skill or effort.

A further object of this invention, is to so construct the decoy, that when not in use, it will occupy a minimum amount of space.

These and other objects are accomplished in the manner set forth in the following specifications, as illustrated in the accompanying drawing, in which.

Similar numbers of reference refer to the same or similar parts throughout the several views.

Figure 1:
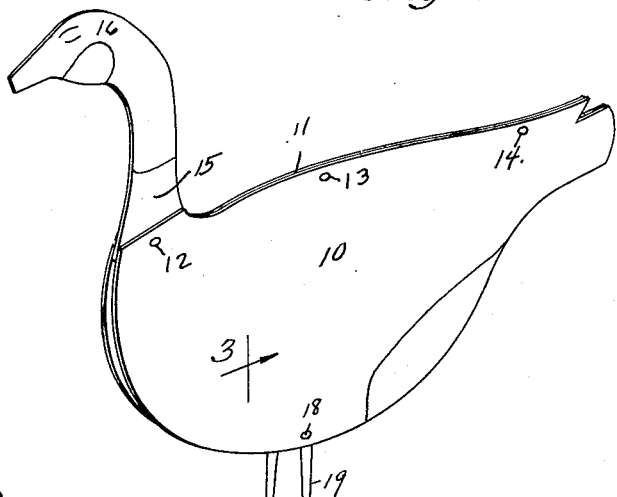
Fig. 1 is a perspective view of the decoy in a set up position.

Referring in detail to the drawing, there is shown a pair of side members 10, forming the body of the goose or duck, along whose back 11 are the rivets 12, 13 and 14.

Figure 2:
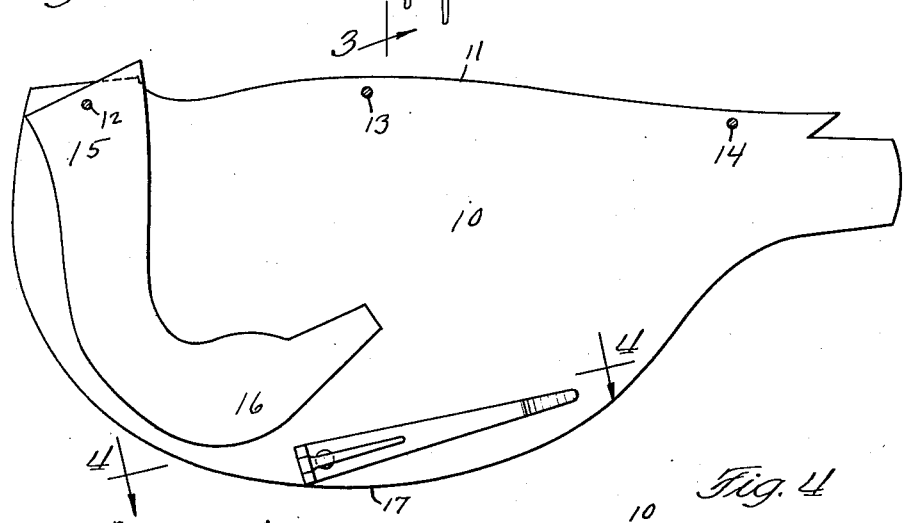
Fig. 2 is a longitudinal section through the decoy, in which one side of the decoy is removed.
Figure 3:
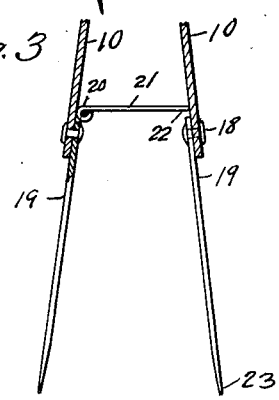
Fig. 3 is a fragmentary section taken along the line 3—3 in Fig. 1.
Figure 4:
Fig. 4 is a fragmentary section taken along the line 4—4 in Fig. 2.

The rivet 12 also extends through a neck member 15, to which is attached a head 16. The neck 15 and head 16 may assume a natural position in relation to the side members 10, or be folded between the members 10, as shown in Fig. 2.

Along the under side 17 of the members 10 are placed the rivets 18, to each of which is hinged a pointed leg member 19. One of the leg members 19 has attached thereto, by means of a hinge 20, a brace 21, whose point 22 extends toward the opposite leg 19, and rests on top of same when the decoy is in an operative position. It is desirable to make the leg members 19 of metal, and to have the points 23 sharpened, so that they may be inserted into a convenient support.

It can be seen from the foregoing, that, although the decoy is made out of sheet material such as metal, plywood or plastic material, it is flexible and presents an appearance of solidarity comparable to that of the common form of decoy without being cumbersome to transport or store, and at a much lower cost.

While I have thus illustrated and described my invention, it is not my desire to be limited to the precise form shown herein, but I intend to cover such forms and modifications of the invention as fall fairly within the appended claim.

I claim:

A decoy consisting of two flexible body members, united along the back thereof by means of rivets, one of said rivets passing through the neck portion of the decoy, a head having a neck attached to said neck supporting rivet, said head and neck being adapted to swing downwardly between the body members to a concealed position, legs pivoted to said body members on the adjacent sides thereof, adapted to be swung upwardly toward a concealed position when not in use, and a brace hinged on one leg member and adapted to be moved to a position against the other body member when the lower portion of said body members are in a spread position.

VIRGIL BALLARD.

REFERENCES CITED

The following references are of record in the file of this patent:

UNITED STATES PATENTS

| Number | Name | Date |
|---|---|---|
| 311,877 | Danz | Feb. 10, 1885 |
| 554,368 | Kunselman | Feb. 11, 1896 |
| 2,313,353 | Mills | March 9, 1943 |